United States Patent [19]

Matsui et al.

[11] Patent Number: 5,408,935
[45] Date of Patent: Apr. 25, 1995

[54] TRANSPORTATION SYSTEM USING MAGNETIC BELT PROPULSION

[75] Inventors: Kazumi Matsui; Takashi Takasue; Nagao Sakakura, all of Tokyo, Japan

[73] Assignees: Furukawa Denki Kogyo Kabushiki Kaisha; East Japan Railway Company; Magnetic Transportation System Engineering Company; Railway Electrical Engineering Association of Japan, all of Tokyo, Japan

[21] Appl. No.: 130,673

[22] Filed: Oct. 1, 1993

Related U.S. Application Data

[63] Continuation of Ser. No. 899,882, Jun. 17, 1992, abandoned.

[30] Foreign Application Priority Data

Jun. 21, 1991 [JP] Japan ..................... 3-175829

[51] Int. Cl.⁶ ............................................. B61C 15/08
[52] U.S. Cl. ................................. 105/78; 105/30; 105/77; 305/60
[58] Field of Search ................. 105/30, 73, 77, 78; 305/15, 60

[56] References Cited

U.S. PATENT DOCUMENTS

| | | | |
|---|---|---|---|
| 1,396,627 | 11/1921 | Denham | 105/30 |
| 1,987,104 | 1/1935 | Guthrie | 105/30 |
| 3,448,694 | 6/1969 | Seyfried | 105/30 |
| 3,868,908 | 3/1975 | Pelabon | 105/1.4 |
| 4,197,934 | 4/1980 | Matsui et al. | 198/472 |
| 4,278,164 | 7/1981 | Matsui et al. | 198/334 |
| 4,289,227 | 9/1981 | Matsui et al. | 198/334 |

FOREIGN PATENT DOCUMENTS

| | | | |
|---|---|---|---|
| 540402 | 5/1957 | Canada | 105/77 |
| 58-23270 | 5/1983 | Japan . | |
| 1160090 | 7/1986 | Japan | 105/78 |
| 20279 | 1/1988 | Japan | 105/77 |
| 63-13911 | 3/1988 | Japan . | |
| 2203108 | 10/1988 | United Kingdom | 305/60 |

Primary Examiner—Robert J. Oberleitner
Assistant Examiner—S. Joseph Morano
Attorney, Agent, or Firm—Keck, Mahin & Cate

[57] ABSTRACT

A magnet-type transportation system of a car-side primary type includes a rail of a magnetic material, fixedly laid down along a traveling track, and a power car capable of self-movement by a plurality of wheels adapted to roll over the traveling track. The power car includes a plurality of magnet belt conveyor units, each having a magnet belt extended in an endless manner around a driving wheel and a driven wheel. The power car also includes a power unit and a power transfer/-transmission mechanism for driving each conveyor unit. The power car is adapted so that the magnet belts mounted thereon are magnetically attracted to the rail.

6 Claims, 3 Drawing Sheets

TRANSPORTATION SYSTEM USING MAGNETIC BELT PROPULSION

This is a continuation of application Ser. No. 07/899,882, filed Jun. 17, 1992 now abandoned.

BACKGROUND OF THE INVENTION

1. Field of the Invention

The present invention relates to a transportation system of a car-side primary magnet type including a rail of a magnetic metal material laid so as to extend along a traveling track, a power car equipped with driving magnet units adapted to be magnetically attracted to the rail for circulating movement and a trailing car or trailing cars coupled to the power car as occasion demands and capable of carrying passengers therein.

2. Description of the Prior Art

A conventional magnet-type transportation system of the so-called CTM (continuous transit system by magnet) type employs a method of fixedly arranging the driving magnet units on the ground side, that is, the method in which the ground side serves as the primary side. More specifically, in this case, a plurality of magnetic belt conveyor units, each having its own circulating speed and connected to a power source, such as an induction motor, and a power transfer mechanism, such as a reduction gear, are arranged at given intervals on the ground side in such a manner that the magnetic belt conveyor units are laterally or vertically arranged at given intervals in a broken-line configuration along the traveling track in curved and grade sections. The resulting ground-side magnetic belt conveyor line is provided with a speed pattern, including given acceleration/deceleration sections and constant speed sections by virtue of the preset circulating speeds of the magnetic belt conveyor units. A car, having an independently moving function including magnet means (electromagnets and/or permanent magnets) adapted to be magnetically attracted to the magnetic belts of the conveyor line through support means, guide wheels and supporting wheels, or a train composed of such cars, is arranged and runs along the line. Such a magnet-type transportation system is well known from, for example U.S. Pat. Nos. 4,197,934, No. 4,278,164, No. 4,289,227, etc. Also, the system has been put in practical use as "MITSUKOSHI PANORAMA LINER" at the EXPO'90 "International Exposition of Flowers and Green Leaves" held in Apr. 1990 in the city of Osaka, Japan.

The conventional magnet-type transportation system is so designed that the car is hauled for movement by the rolling of the supporting wheels over the traveling track surface due to the magnets on the car side being magnetically attracted to the magnetic belt conveyors. In this case, the rotating shafts of the magnetic belt conveyor units are used in their horizontal or vertical positions. In the curved sections the car is forcibly guided along the guide tracks which are separately laid down, in addition to the ordinary traveling track.

Also, in the case of a continuous moving path (moving side-walk) disclosed, for example, in Japanese Patent Application No. 13911/1988, the magnetic belts of ground-side magnetic belt conveyor units are composed of belts with magnets. Also, the previously mentioned cars are replaced with a plurality of footboard pedestals, which are individually provided with magnetic pieces adapted to be magnetically attracted to the magnet belts and connected with one another by elastic coupling mechanisms of relatively low flexibility. These pedestals are arranged so as to be movable over the traveling path by means of the supporting wheels.

The conventional magnet-type transportation system presupposes a mass transportation of the type in which the cars or pedestals successively arrive at equal intervals of time at the platform so that the plurality of magnetic belt conveyor units, having individually preset speeds, are arranged along the traveling track irrespective of the variations and volume of the traffic demand and the line, on the whole, is provided with the necessary acceleration and deceleration pattern and constant speed pattern. In this case, it is necessary to arrange so that even if the circulating movement of the magnetic belt conveyor units, constituting the ground-side driving source, stops or the electromagnets on the car or the like are deenergized, due to such an inconvenience as the interruption of service in any part, the cars or the pedestals are restarted at the point of fault upon the resumption of normal service. For this purpose, the magnetic belt conveyor line must be composed of the magnetic belt conveyor units arranged at given intervals as the primary means on the ground so that of the plurality of magnets (of the hybrid type using both electromagnets and permanent magnets) on +the car side, the required number of the magnets are always attracted to any of these magnetic belt conveyor units.

As a result, it can be said that up to the time when the actual traffic demand attains the mass transportation demand predicted at the time of the building, the number of the magnetic belt conveyor units is considered to be excessive, in view of the actual traffic demand, but are arranged on the magnetic belt conveyor line. Also, to circularly move the magnetic belt conveyor units on the whole line regularly causes excessive energy consumption and excessive noise, thus requiring considerable contrivances. Also, essentially, the magnetic belt conveyor units must be arranged in the central portion of the traveling track and, therefore, the traveling track requires a space for the arrangement of the conveyor units as well as the attendant motors, rotation transmission mechanisms, etc. Therefore, particularly in the case of an elevated type of track, the girders forming the traveling track must be of the open structure to ensure the required space. An attempt to ensure a sufficient strength against the load inevitably limits available space, thereby placing a limitation to the construction of the magnetic belt conveyor system which can be arranged within the available space.

The conventional magnet-type transportation system is disadvantageous in that the preset car traveling speed pattern is not variable and, therefore, any change of the traveling pattern, e.g., an increase or decrease of the platforms, a change in the traveling track design, a change in the length of the train or the like requires a change in the combination of the existing magnetic belt conveyor units or their replacement.

Also, while all the magnetic belt conveyor units on the line can be kept circulating regularly, in order to ensure the desired energy saving and reduce the occurrence of noise due to the circulating movement, it is necessary to add a system so that as for example, only the magnetic belt conveyor units in the "feeder section", where the car exits, and the adjacent "feeder section" in front thereof in the direction of travel, are circulated; this is shifted along with the traveling of the car.

Since the magnetic belt conveyor units are arranged in a broken-line configuration in each of the grade and curved sections, when the car is forcibly guided along the curve by its guide wheels, the magnets on the car side do not follow the broken line but are obliquely moved relative to the magnetic belt surfaces under the effect of a torsional force, corresponding to the angle of the broken line, so that depending on the circumstances, the magnets are returned to the original positions only when the magnetic belts get off in the width direction and get rid of the torsional force in the gap portion between them and the preceding magnetic belts. In this case, the guide wheels also forcibly guide the car along the curved traveling track and are, therefore, subjected to a torsional force. Thus, a contrivance is required for alleviating and eliminating the occurrence of fatigue rupture due to the repetition of these actions.

With the conventional magnet-type transportation system, when the car passes over adjoining magnetic belt conveyor units, which are different stepwise in circulating speed from each other, or during the acceleration or deceleration period, the car is accelerated or decelerated to the preset speed of the destination magnetic belt conveyor units with an attendant slip between the attracted surfaces of the car magnets and the magnetic belts of the magnetic belt conveyor units. In this case, an irregular speed oscillation phenomenon, tending to deteriorate the riding comfort is caused in the car. Therefore, is necessary to devise a counter measure such as the one disclosed in Japanese Patent Publication No. 23270/1983 in which the arranging interval between the magnetic belt conveyor units is preset in correlation with the spacing between the foremost magnet and the rearmost magnet of the car in such a manner that the rearward magnets of the car are separated from the magnetic belt conveyor units to which the magnets were previously attracted as soon as the forward magnets in the travel direction of the car completely pass over to the preceding adjoining magnetic belt conveyor units. This counter measure gives rise to an inconvenience of limiting the allowance for the designing of the line.

Also, in the conventional magnet-type transportation system, the divergence and convergence of the line are effected in a manner such as that disclosed, for example, in the previously mentioned three U.S. Pat. Nos. In other words, a pair of electromagnets, each having pole faces turned toward the right and left sides respectively, are mounted on the car side and magnetic belt conveyor units, having vertical rotary shafts, are arranged on the right and left side walls of a ground traveling track so as to correspond to the pole faces. Only one or the other of the pair of electromagnets is energized and selectively attracted to the magnetic belt surface of the corresponding magnetic belt conveyor units, thereby causing the car to proceed in the direction of one branching side. The energization of the other electromagnet similarly causes the car to proceed in the direction of the other branching side. In this case, however, at least the pair of electromagnets having the pole faces turned toward the right and left sides must be arranged on the car side and their energization and deenergization must be controlled for the selection of the desired branching direction, thus making it impossible to use permanent magnets. In addition, the pair of vertical-type magnetic belt conveyor units respectively facing the right and left sides must be arranged on the side walls of the traveling track at each of the divergent and convergent portions and, moreover, the broken-line arrangement is required between the adjoining magnetic belt conveyor units at each of the divergent and convergent portions, thus causing the occurence of a torsional force corresponding to the broken-line angle in the car magnets in the same manner as mentioned previously.

SUMMARY OF THE INVENTION

It is the primary object of the present invention to provide a new and novel magnet-type transportation system in which the car side serves as the primary side and the ground side serves as the secondary side, thereby overcoming the foregoing deficiencies in the prior art.

It is another object of the present invention to provide a magnet-type transportation system so designed that only a fixed rail is laid down on the ground side so as to make the maintenance and safety control of the ground equipment easy and concentrate power equipment on the car to make it possible to perform the maintenance and repair of the power equipment in a factory, thereby making it possible to accommodate variations in the volume of traffic demand by varying the number of cars operated, the train make-up and the train operation interval. Such a system also eliminates danger of the ground equipment becoming a source Of noise and reduces the required energy to the minimum requirement.

In accordance with one aspect of the present invention there is provided a manget-type transportation system of the car-side primary type including, as concrete means for overcoming the foregoing deficiencies, a rail made of a magnetic material, fixedly arranged along a traveling track, and a power car capable of self-movement by its wheels which roll over the traveling track. The power car is equipped with a plurality of magnet belt conveyor units, each having a magnet belt extended around a driving wheel and a driven wheel in an endless manner, a power unit and a power transfer/transmission mechanism for driving each belt conveyor unit. The magnet belts are adapted to be magnetically attracted to the rail.

In accordance with still another aspect of the present invention, the plurality of magnet belt conveyor units are arranged in pairs, each including the-magnet belt conveyor units arranged on both sides of the rail so as to oppose each other through the rail. Each pair of magnet belt conveyor units is preset to be opposite in the direction of circulating movement to each other.

In accordance with still another aspect of the present invention, a trailing car, equipped with no magnet belt conveyor units, is coupled to the power car and at least one or the other of the power car and the trailing car is provided with supporting wheels, which roll over the traveling track surface and guide wheels, which roll over the rail to guide the car.

In accordance with still another aspect of the present invention, a plurality of such cars compose a train make-up and the leading car and the rear car of the train make-up are each comprised of the power car.

With the magnet-type transportation system according to the present invention, the power car is self-movable by its rolling wheels over the track surface on both sides of the rail. The rail is made of a magnetic material, e.g., steel, and laid down over the traveling track. Driving for self-movement of the power car is effected by rotating the magnet belt conveyor units mounted on the power car from the power units through the power transfer/transmission mechanisms. A train can be formed by coupling trailing cars without power units to the power car. In this case, the power car and/or the trailing cars are each provided, in addition to the supporting wheels which roll over the traveling track, with guide wheels which roll over the surface of the rail so as to laterally guide the car or cars.

Each of the magnet belt conveyor units preferably includes a magnet belt extended in an endless manner around the driving wheel and the driven wheel, each having the vertical rotary shaft. The magnet belt of the belt conveyor unit is magnetically attracted, for example, to the side of the rail. When the magnet belts are driven into rotation by the power units, due to the magnetic frictional force resulting from the magnetic attraction force, the belt conveyor units are moved along the rail at the circulating speed of the magnet belts and thus the car supporting the belt conveyor units is hauled so as to run along the rail.

The rail is made by forming a magnetic material, typically consisting, for example, of a ferrous material, into a given cross-sectional shape of a volumetric amount which is sufficient to make the magnetic attraction force satisfactory. The sides of the rail form magnetic attraction surfaces which are, for example, perpendicular to the traveling track surface. For instance, the rail can be constructed by laying a steel plate of certain thickness and width in a vertical position along the central portion of the car traveling track by a suitable fixing mechanism. Also, the magnet belt conveyor units may be mounted on the car in the form of a paired construction which are arranged on both sides of the rail. The power unit may be composed of any of various motors, such as an induction motor, which is fed externally of the car through stringing, a third rail or the like and a speed controller. Also the power transfer/transmission mechanism may be composed of any of various gearings, whereby the mechanical output of the motor is transmitted to the driving wheel of the belt conveyor unit and, conversely, the mechanical energy from the belt conveyor unit is transmitted to the motor side for the purpose of power regeneration.

In accordance with the present invention, it is only necessary to lay down the stationary rail on the ground side without the need to arrange the power units and, therefore, maintenance and safety control of the ground equipment are easy. Also, the power equipment can be concentrated on the car so that when the maintenance and repair are required, the power equipment can be carried into and set up in the factory. In addition, any variation in the volume of traffic demand can be accommodated by simply varying the number of operated cars, the train make-up and the operation time interval, and there is no danger of the ground equipment becoming a source of noise. Also, the required energy can be reduced to that corresponding to the operated cars.

Also, the present invention is advantageous in that the acceleration, deceleration and constant speed operations can be selectively performed and the operation speed pattern can be easily varied owing to the provision of the speed controller, e.g., a variable-voltage frequency converter on the car side. Also the speed oscillation phenomenon during the starting period as well as the acceleration/deceleration period can be reduced, thus considerably improving the riding comfort. A car, stopped due to such an inconvenience as the interruption of service, can be started again at any position according to the desired acceleration pattern. If the magnet belt conveyor units of the car are constructed so that its magnets include permanent magnets, when stopping the car at a grade point, the magnet belts are continuously attracted magnetically to the rail, thereby making it possible to keep the car at the stopped position by means of the braking force of the magnet belt conveyor units and eliminating the need to provide the running wheels with a braking function.

It is to be noted that as compared with the conventional magnet-type transportation system of the ground-side primary type, the present invention structurally eliminates the need for the magnets heretofore provided for the respective cars as well as the need for the magnetic belt conveyor units heretofore arranged at given intervals on the ground. Also, the invention eliminates the need for the forced steering guide tracks provided on both sides of the traveling track, thereby practically eliminating the occurrence of inconveniences due to the repeated application of a torsional force to the guide wheels and other structural members on the car side.

The above and other objects, features and advantages of the present invention will become more apparent from the following detailed description of its preferred embodiment taken in conjunction with the accompanying drawings.

DESCRIPTION OF THE PREFERRED EMBODIMENTS

Figure 1:
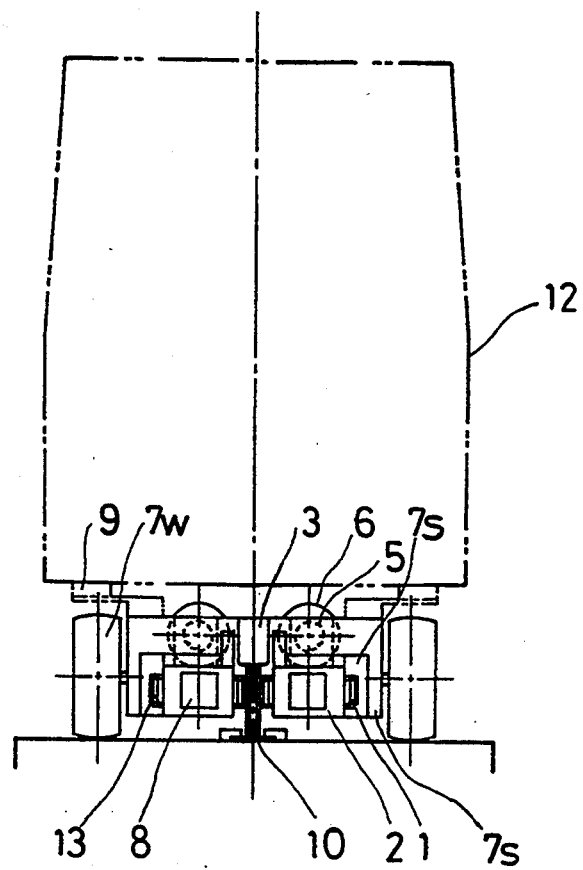
FIG. 1 is a front view showing schematically an embodiment of the present invention.
Figure 2:
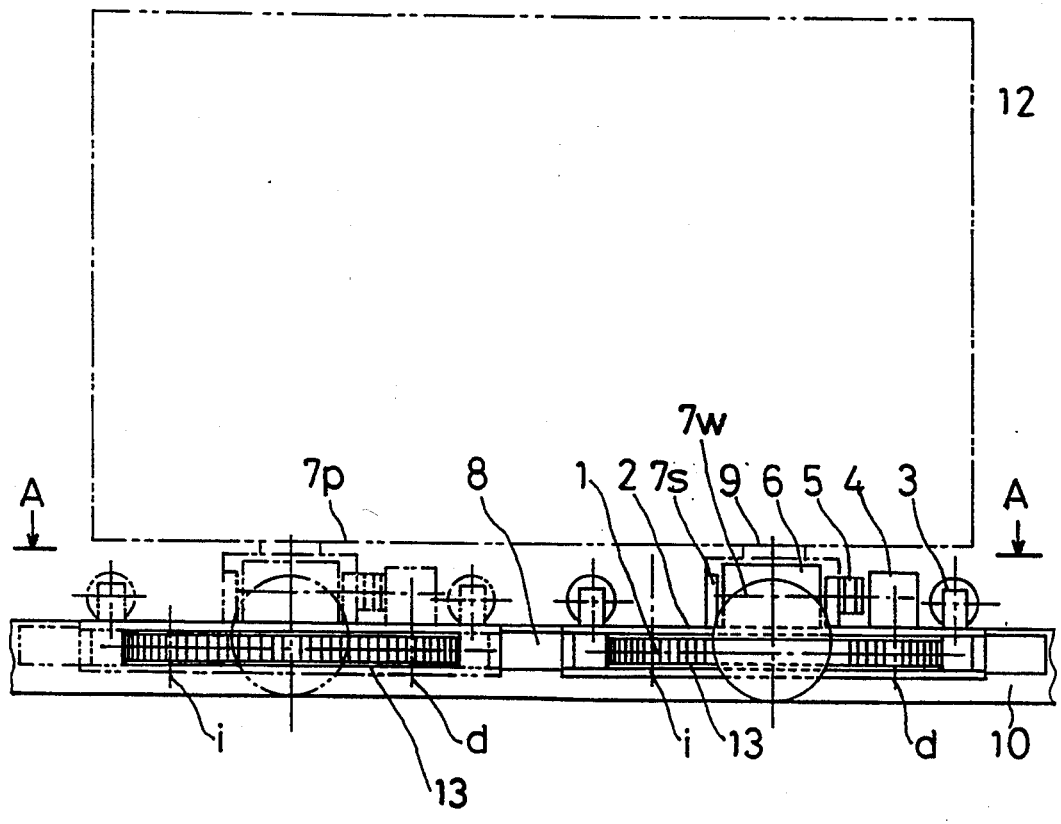
FIG. 2 is a side view showing schematically the embodiment of the present invention.
Figure 3:
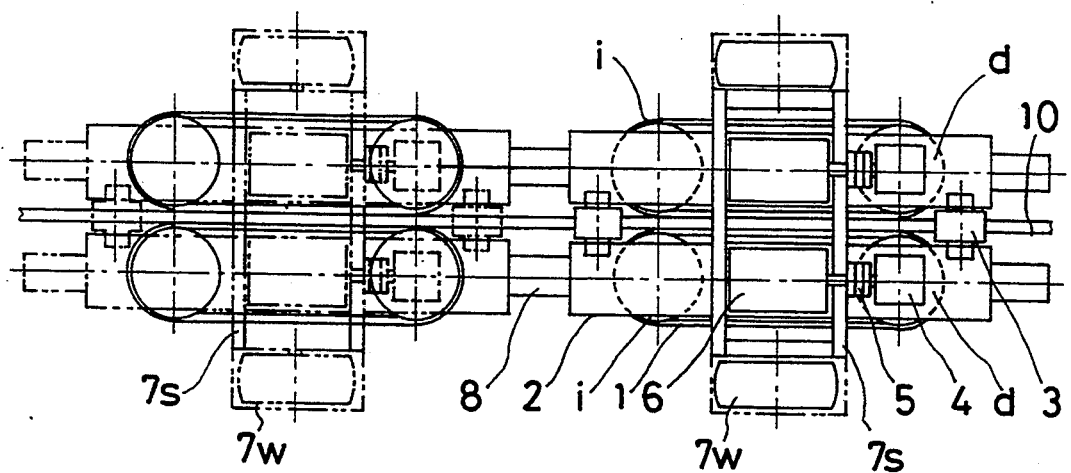
FIG. 3 is a view in the direction of the arrows of line A—A of FIG. 2.

Referring to FIGS. 1 to 3, there is illustrated an embodiment of the present invention. In the figures, laid down over a paved traveling track 11 is a rail 10 made of a steel material (magnetic material) formed into a desired cross-sectional profile by roller rolling, for example, and having sides which form vertical and continuous magnetic attraction surfaces. A car 12 is supported on the traveling track 11 by means of supporting wheels 7w which roll over the surface of the traveling track 11 on both sides of the rail 10. Arranged below the floor of the car 12 are two pairs of right and left supporting frames 2 which are respectively positioned at the front and rear portions. Each of the supporting frames 2 is supported by a supporting spring 9. A magnet belt conveyor unit 13 is arranged within each of the supporting frame.

The magnet belt conveyor unit 13 includes a driving wheel d and a driven wheel i, each having a vertical rotary shaft, and an endless magnet belt 1 having a plurality of split magnets and an enclosing yoke attached to its outer surface and extended around the driving wheel d and the driven wheel i, and the magnet belts 1 of the right and left magnet belt conveyor units 13 are adapted to be magnetically attracted to the sides of the rail 10. Attached to each supporting frame 2 are a reduction gear (bevel gearing) 4, a motor 6 such as an induction motor serving as a driving source and a coupling 5 for effecting the transmission of torque between the reduction gear 4 and the motor 6. Since the supporting frames 2 support the wheels 7w with a single shaft structure so that they interfere mechanically with the car 12 when a pitching vertical movement is caused during the traveling of the car, a supporting roller 3 adapted to roll over the surface of the rail 10 is arranged near to each of the front and rear ends of the supporting frames 2 so as to prevent such interference. The supporting rollers 3 bear the load of the supporting frames 2 which are supported by the supporting springs 9, and the supporting frames 2 are respectively connected to supporting frames 7s of the supporting wheels 7w which, in turn, bear the whole of the car load.

Thus, in order to obtain more stable magnetic attraction forces which externally act on the sides of the rail 10 laid down to extend over the traveling track 11, the magnet belt conveyor units 13, which are opposite in the direction of circulating motion and form a pair, are arranged at each of the front and rear portions of the car body, thereby providing the so-called power car according to the present invention. It is needless to say that trailing cars having no power systems, i.e., magnet belt conveyor units, electric motors, etc., can be coupled to the power car to make up a train.

In this case, as the magnet belt conveyor units of the power car, it is generally preferable to use magnet belts, which are readily flexible to correspond to the curved configurations of the rail 10, in the curved sections, including the grade sections, without the application of any special tension to the magnet belts instead of magnetic belt conveyor units of the heretofore known type employing the intermediate guide rollers which guide and bear the circulating movement of the magnetic belts. By so doing, it is no longer necessary to steer and guide the car, or a plurality of the cars connected to form a train, by a forcible external force due to the interaction between the guide wheels and the guide wall as in the case of the conventional magnet-type transportation system of the ground-side primary type. Particularly, in the case of the ground-side primary type of system, the magnetic belt conveyor units are arranged in the broken-line configuration in the curved sections, as well as at the grade entrance and exit locations, so that the previously mentioned forcible external force becomes excessively large as compared to that for the straight sections and a torsional force acts between the car body and the magnets attracted to the magnetic belts. The present embodiment does not produce such problems.

With the present embodiment, the addition of the speed controller, such as a variable-voltage frequency converter for making the circulating speed of the magnet belt conveyor units 13 of the power car variable, permits one to selectively effect the variable speed operation and the constant speed operation.

Further, where the power car of the present embodiment is coupled to trailing cars to make up a train, it is advantageous to use the illustrated power car having the independent functions only on the forward side in the travel direction and then couple to it trailing cars on the rear side through, for example, coupling devices 8 with the interposition of for example, an elastic material. In this case, each of the trailing cars is provided with a plurality of pairs of guide rollers for steering and guiding it along the sides of the rail 10.

Where the traveling track 11 is not a loop traveling track and a turn-back operation of cars is performed on the same traveling track, it is only necessary that the power car having independent functions is arranged at each of the forward and rear sides of the train or the ends of the train, whereas if the train make-up is longer, a suitable number of the power cars may be advantageously coupled to the intermediary portions. In either of the cases, it is only necessary to construct the drive system of the magnet belt conveyor units 13 of the power cars in such a manner that the direction of circulating movement of the magnet belts 1 can be reversed.

What is claimed is:

1. A magnet-type transportation system comprising:
    a rail, made of magnetic material, fixed to a travelling track;
    a power car movable along the travelling track;
    a pair of right supporting frames and a pair of left supporting frames arranged below said power car, each of said right supporting frames opposing one of said left supporting frames and being disposed on a right side of said rail, each of said left supporting frames opposing one of said right supporting frames and being disposed on a left side of said rail;
    a pair of wheel supporting frames, one of said wheel supporting frames connected to each set of opposing left and right supporting frames;
    two pairs of supporting wheels rolling on said travelling track, each pair of supporting wheels supported on opposite sides of said rail by one of said wheel supporting frames, said supporting wheels bearing a load, provided by said car, applied to the wheel supporting frames;
    a front supporting roller, rolling over a top surface of said rail, provided near front ends of each set of opposing left and right supporting frames;
    a rear supporting roller, rolling over a top surface of said rail, provided near rear ends of each set of opposing left and right supporting frames, the front supporting roller and the rear supporting roller combining to bear a load of the opposing left and right supporting frames;
    a magnet belt conveyor unit on each of said right supporting frames and on each of said left supporting frames, each magnet belt conveyor unit having (i) an endless magnet belt adapted to be magnetically attracted to a side surface of said rail, (ii) a driving wheel and a driven wheel, said endless magnet belt extending around said driving wheel and said driven wheel, and (iii) power transfer means for driving said magnet belt conveyor unit so that said endless magnet belt moves in a direction of circulating movement, each magnet belt conveyor unit being mounted on one of said supporting frames so that its endless magnet belt opposes and moves in a direction of circulating movement opposite to that of an endless magnet belt of another magnet belt conveyor unit.

2. A magnet-type transportation system as defined by claim 1, and further comprising a pair of supporting springs provided between said power car and each of said wheel supporting frames.

3. A magnet-type transportation system as defined by claim 1, and further comprising a trailing car, equipped with no magnet belt conveyor, coupled to said power car.

4. A magnet-type transportation system as defined by claim 3, and further comprising at least one other power car, coupled to said trailing car so as to form a train and so that front and rear cars of said train are formed by the power cars.

5. A magnet-type transportation system as defined by claim 1, wherein said power transfer means comprises a motor, mounted on one of said supporting frames, and means for transmitting power from said motor to said driving wheel.

6. A magnet-type transportation system as defined by claim 5, wherein said means for transmitting power comprises gearing driving said driving wheel and a coupling provided between said motor and said gearing.

* * * * *